July 23, 1968 N. H. MILLER 3,393,768
MULTIPLE LIFT APPARATUS
Filed Feb. 21, 1967 4 Sheets-Sheet 2
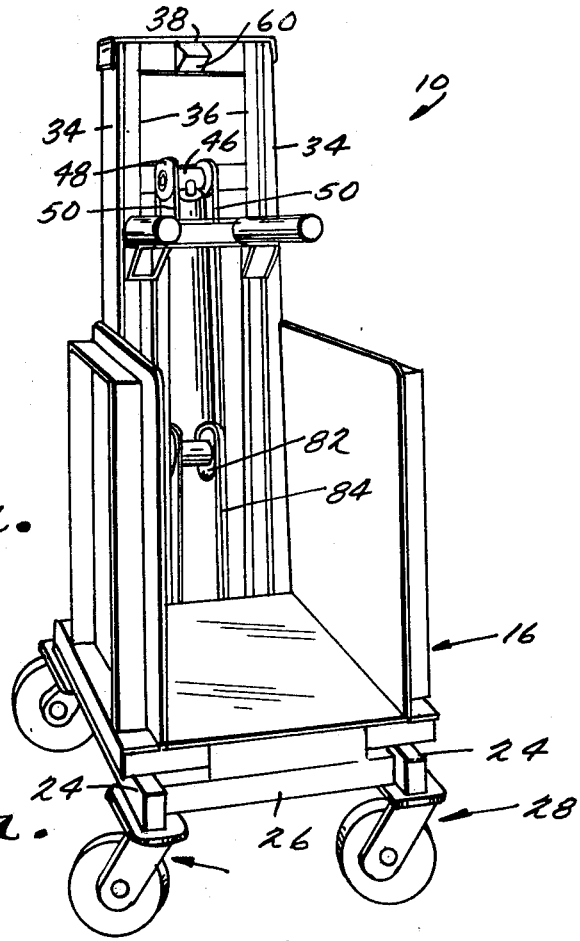
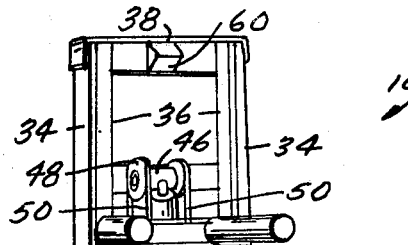
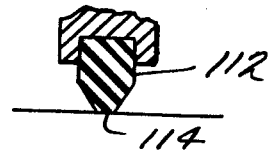
Fig. 5a.
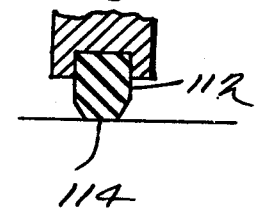
Fig. 6a.
Fig. 5.
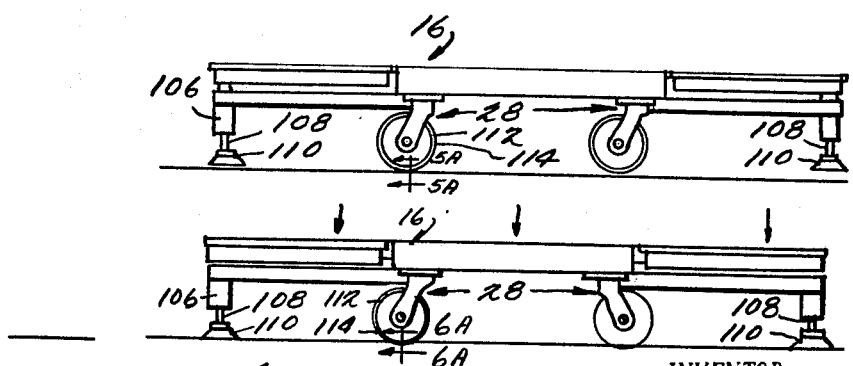
Fig. 6.
INVENTOR.
NORMAN H. MILLER
BY
Cushman Darby & Cushman
ATTORNEYS July 23, 1968   N. H. MILLER   3,393,768
MULTIPLE LIFT APPARATUS
Filed Feb. 21, 1967   4 Sheets-Sheet 3

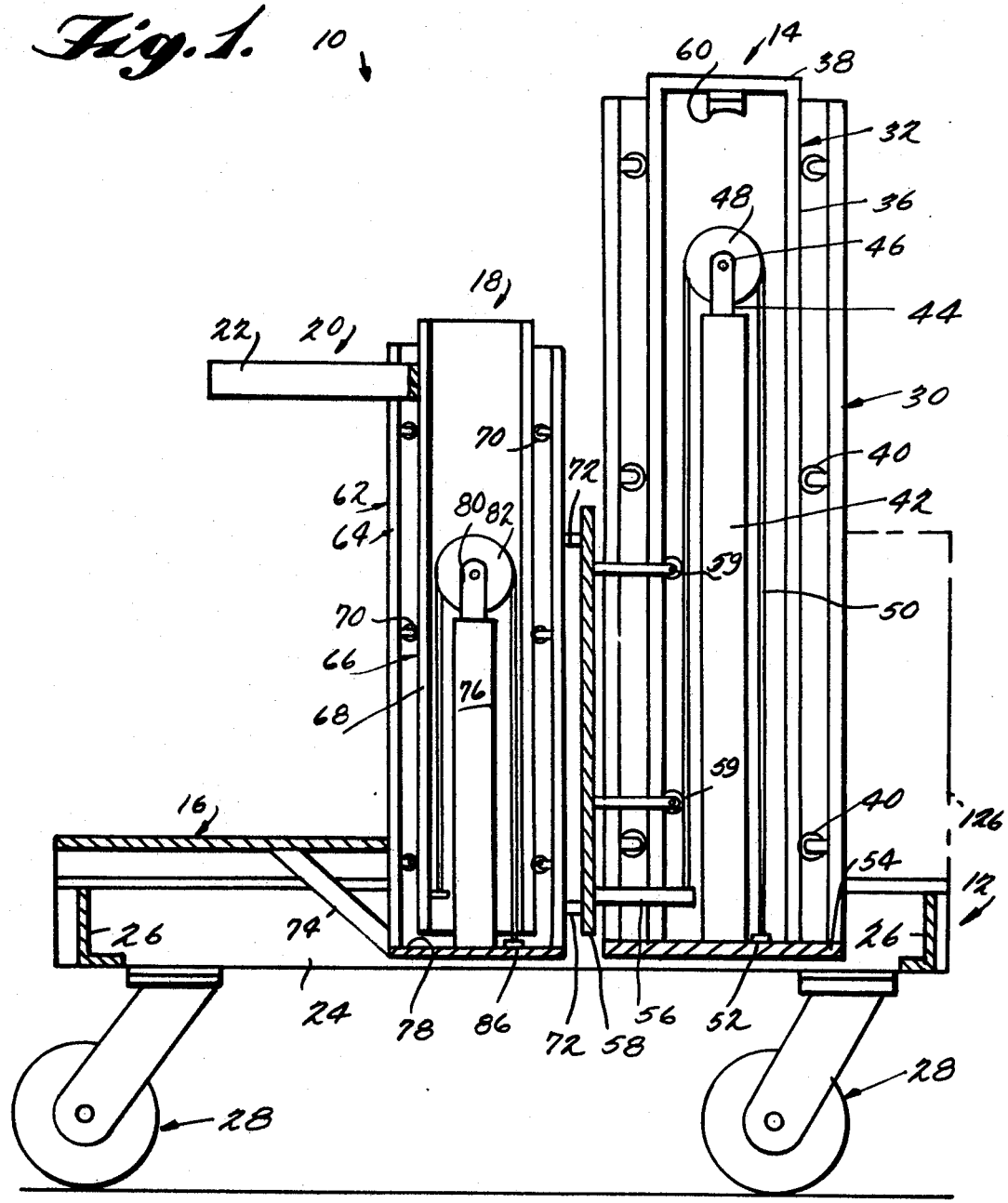

INVENTOR.
NORMAN H. MILLER
BY Cushman, Darby & Cushman
ATTORNEYS

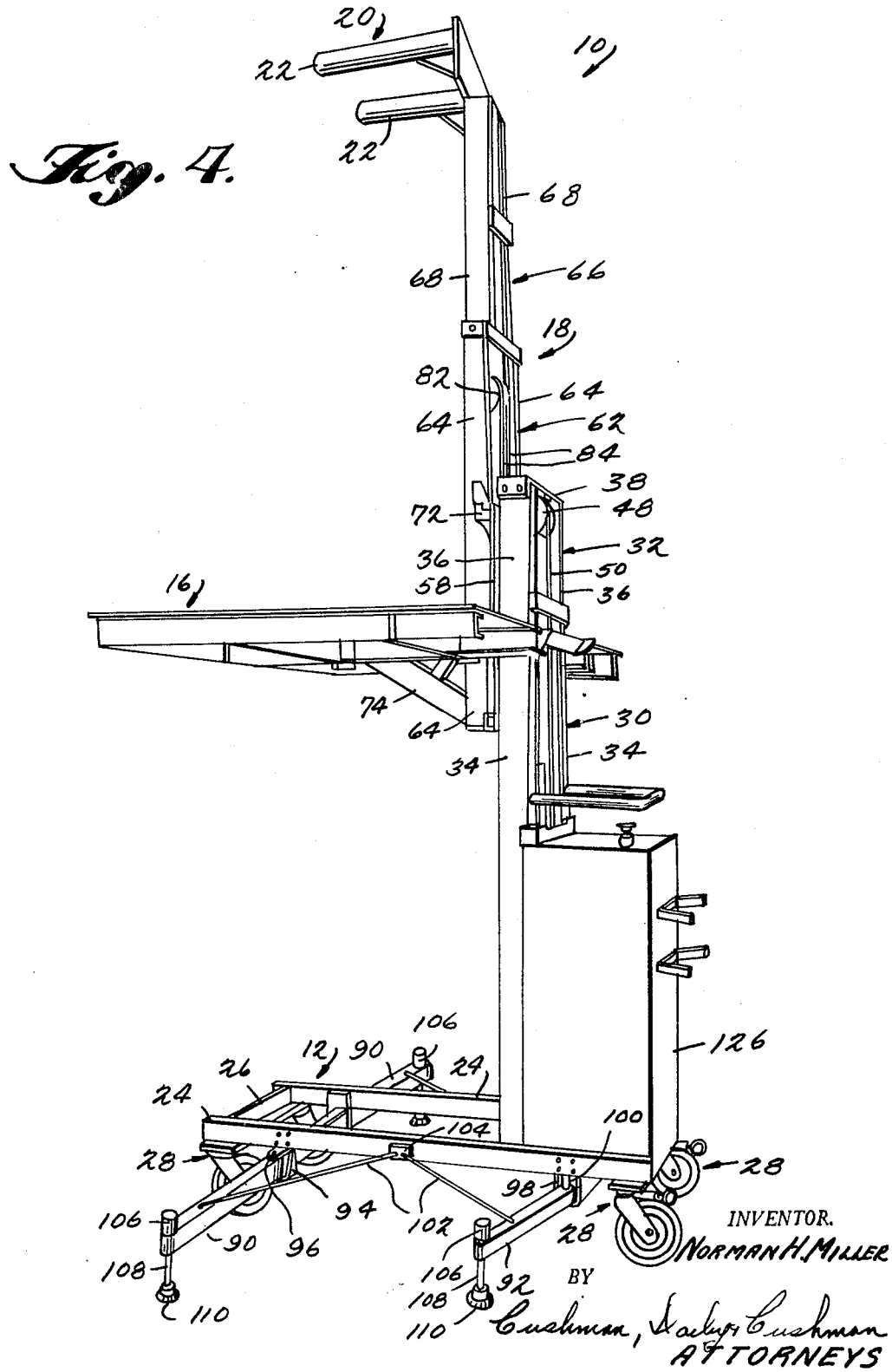

United States Patent Office 3,393,768
Patented July 23, 1968

3,393,768
MULTIPLE LIFT APPARATUS
Norman H. Miller, 8715 Woolworth Ave.,
Omaha, Nebr. 68115
Filed Feb. 21, 1967, Ser. No. 617,536
5 Claims. (Cl. 182—15)

ABSTRACT OF THE DISCLOSURE

A multiple lift machine for hoisting men and materials to variable heights relative to each other and to the ground. An operator platform is carried by a wheeled base and is vertically adjusted relative to the base by a hydraulic ram and chain unit. A second ram and chain unit carried by the operator platform adjusts the vertical position of an equipment platform above the operator platform. The wheeled base includes laterally extending outrigger stabilizing arms which are hinged to permit them to swing inwardly toward the base so as to reduce the lateral dimension of the machine when a doorway is to be negotiated. The wheels include tires which partially collapse when a load is placed on either platform thereby lowering the base so that the ends of the stabilizer arms engage the floor.

---

This invention relates to a hoisting machine adapted to raise an operator and equipment, such as lighting fixtures and heating ducts, to variable heights above the floor for the purpose of facilitating the installation of the equipment at ceiling height. In particular the invention relates to a machine of this kind having an operator platform and an equipment platform located thereabove, the two platforms being independently adjustable under the control of the operator.

The present machine is an improvement over the machine disclosed in my prior Patent 2,938,595, issued May 31, 1960.

One important feature of the present machine lies in the separate vertical adjustment of the operator platform and the equipment platform. The machine is constructed of a wheeled base and an overlying operator platform which is raised and lowered relative to the base by means of a hydraulic ram and chain device carried by the base. Fixed to the operator platform is another hydraulic ram and chain device which raises and lowers the equipment platform relative to the operator platform. This arrangement greatly facilitates the installation of equipment at ceiling height, primarily because it permits the operator to raise and lower himself as it becomes necessary to work on different parts of the equipment.

Another novel feature of the machine relates to its ability to pass through doorways with a minimum of difficulty. To this end the wheeled base, which is constructed of a size to pass through a doorway, is provided with pivoted, laterally extending stabilizer arms capable of swinging in toward the longitudinal center line of the base so as to reduce the overall transverse dimension of the machine. In use the stabilizer arms extend outwardly from the sides of the base and engage the floor at their outer ends so as to prevent the machine from tipping under the influence of a change in the position of a load.

Another novel feature relates to the ability of the stabilizer arms to engage the floor automatically when a load is placed on the machine. To this end the wheels include tires which partially collapse under a predetermined load thereby lowering the base and the stabilizer arms. Preferably the tires are constructed of solid resilient material, such as solid rubber, formed into one or more circumferential floor-engaging ribs which flatten under load. A particularly suitable tire has a V-shaped tread surface, the apex of the V defining the just-mentioned rib.

The invention will be further understood from the following detailed description of an illustrative embodiment taken with the drawings in which:

FIGURE 1 is a schematic vertical sectional view illustrating the principles of the construction and operation of the hoist portion of a machine constructed according to the present invention;

FIGURES 2, 3 and 4 are perspective views of an actual machine embodying the features shown in FIGURE 1;

FIGURES 5 and 6 are fragmentary elevational views of the floor-engaging portions of the machine;

FIGURES 5A and 6A are sectional views, on an enlarged scale, taken on the lines 5A—5A and 6A—6A of FIGURES 5 and 6.

Figure 3:
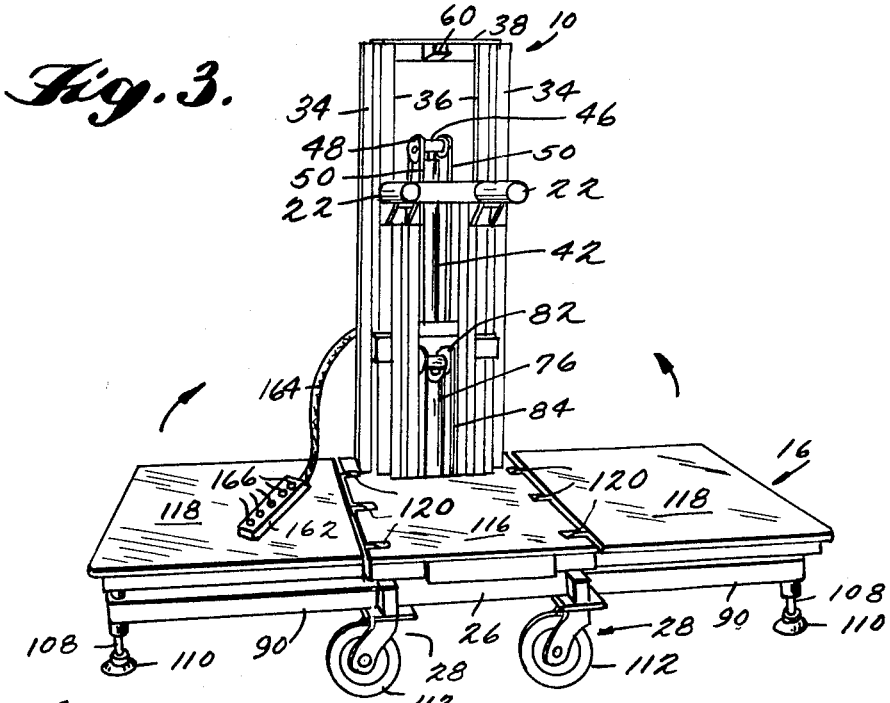

Referring to FIGURE 1 there is shown schematically and in vertical section a multiple hoist machine 10 having a hoist system which embodies the principles of the present invention. In the interest of clarity the spacing between the various hoist elements and the size of the elements relative to the remainder of the machine 10 have been exaggerated. The reference numerals in FIGURE 1 are applied to the same parts in FIGURES 2, 3 and 4, the latter figures illustrating an actual embodiment of the machine.

As shown, the machine 10 includes a generally rectangular wheeled base 12 which carries affixed thereto a main hoist mast 14 adapted to raise and lower an operator platform 16. A secondary hoist mast 18, affixed to the operator platform 16 and vertically movable therewith, is adapted to raise and lower an equipment platform 20 which is illustrated in the form of a pair of horizontally spaced-apart arms 22. The base 12 is constructed in any suitable form and, as shown, may be formed of a pair of elongated side members 24 interconnected by front and rear members 26. A caster wheel unit 28 is secured to the undersurface of the base 12 at each corner.

The main hoist mast 14 includes a fixed outer section 30 and a vertically movable inner section 32. The outer section 30 may be formed of a pair of laterally spaced-apart channel members 34 which are rigidly secured to the base 12 at their lower ends. The inner section 32 may also be formed of spaced-apart channel members 36 which are interconnected by suitable horizontal plates or brackets 38. A plurality of rollers 40, mounted on the inner surface of the outer channels 34, engage the inner channels 36 and prevent lateral movement between the two sections of the mast.

The main hoist mast 14 is provided with a hydraulic ram and chain arrangement adapted to raise and lower the inner mast section. The ram includes a hydraulic cylinder 42 disposed vertically within the inner mast section 32 and having an upwardly extending piston rod 44 which carries a crosshead 46 at its free end. Rotatably mounted on the crosshead 46 are a pair of double-flanged wheels 48 over each of which is trained a hoist chain 50. One end of each chain 50 is fixed with respect to the outer mast section 30 as by being secured at 52 to a base plate 54. The other end of each chain 50 is secured by a suitable rigid connection 56 to a vertical hoist plate 58 disposed just forwardly of main mast 14. The hoist plate 58 is vertically movable relative to the inner channels 36 and is restrained against horizontal movement by rollers 59. The upper end of the inner mast section 32 carries an abutment 60 which is engaged by the crosshead 46 when the ram has partially extended the piston rod 44.

The secondary mast 18 includes an outer section 62 formed of spaced-apart channel members 64 and a telescopic inner section 66 formed of spaced channel members 68. Rollers 70 mounted on the outer channels 64 engage the inner channels 68 and prevent relative horizontal movement between the two sections 62 and 66. The equipment lifting arms 22 are connected to the upper end of the inner section 66, as by welding, and project forwardly between the channels 64. The outer section 62 is rigidly secured to the front surface of the hoist plate 58, as at 72. The operator platform 16 is rigidly secured to the outer section 62 as by welding and by means of an inclined brace member 74. By means of this arrangement extension of the piston rod 44 in the main mast 14 raises the secondary mast 18 and operator platform as a unit.

The inner section 66 of the secondary mast 18 is raised and lowered relative to the outer section 62 by means of a hydraulic ram and chain unit. An upright hydraulic cylinder 76 is fixed within the inner section 66 as by being secured at its lower end to a base plate 78. An upwardly extending piston rod 80 carries a pair of rotatable double-flanged wheels 82 at its upper end, and a hoist chain 84 is trained over each wheel 82. One end of each chain 84 is fixed to the base plate 78 at 86, and the other ends are connected to the inner channels 68 at 88.

Referring more specifically to the construction of the base 12 it will be seen in FIGURE 4 that each longitudinal frame member 24 carries two stabilizer arms 90 and 92 which are pivoted for swinging movement in a horizontal plane. The forward arms 90 are pivoted by means of brackets 94 for movement about vertical axes 96 which are located outwardly of the frame members 24. The rear arms 92 are pivoted by means of brackets 98 for movement about vertical axes 100 passing through the frame members 24. By means of this arrangement the rear arms 92 can be rotated forwardly to lie against the frame members 24, and the forward arms 90 can be rotated rearwardly to lie against the rear arms 92, as seen in FIGURE 2. Under these conditions the overall transverse dimension of the base 12 is less than the width of a standard doorway. Each of the arms 90, 92 may be held in its laterally extended position by a suitable latch arrangement. As best shown in FIGURE 4 the latch may take the form of a rod 102 having each end bent into a hook. One end fits into a hole in the respective arm, and the other end fits into a hole in a bracket 104 carried on the adjacent frame member 24.

The outer end of each stabilizer arm 90, 92 carries a small, vertically disposed hydraulic ram which includes a cylinder 106 fixed to the arm and a movable piston rod 108. The lower end of the piston rod 108 carries a floor-engageable foot 110 which, when in contact with the floor, prevents the base 12 from tipping during a change in the position of a load on the operator platform 16 or on the equipment arms 22. Normally the cylinders 106 will be hydraulically locked with the stabilizing feet 110 disposed a short distance, for example ¾ inch, above the floor.

Referring now to FIGURES 5, 5A, 6 and 6A it will be seen that each wheel unit 28 includes a solid rubber tire 112 having a tapered tread surface terminating in a central rib 114. The rubber is sufficiently resilient that it will be deformed under load and thereby automatically lower the machine 10 when a weight is applied. With this arrangement the piston rods 108 may be adjusted and locked in such positions that the weight of an operator as he steps onto the platform 16 will collapse the tires sufficiently to engage the feet 110 with the floor. It is therefore not necessary that the piston rods 108 be extended hydraulically each time that it is desired to stabilize the machine against tipping.

The solid rubber construction of the tires 112 is preferred over pneumatic or semi-pneumatic construction, because the desired partial collapse under weight is more reproducible and because the solid construction is more resistant to cuts and breaks under the conditions normally present during the construction of a building. In addition, the rib shape of the tread surface produces a relatively small bearing area so that the wheels will turn easily.

The operator platform 16 is constructed of a center section 116 and two side sections 118 which are pivotally connected to the center section by hinges 120. As seen in FIGURE 2 the side sections 118 may be folded upwardly so that the transverse dimension of the fold platform 16 is about equal to the overall width of the base 12 with the stabilizing arms 90, 92 in their folded positions.

Figure 7:
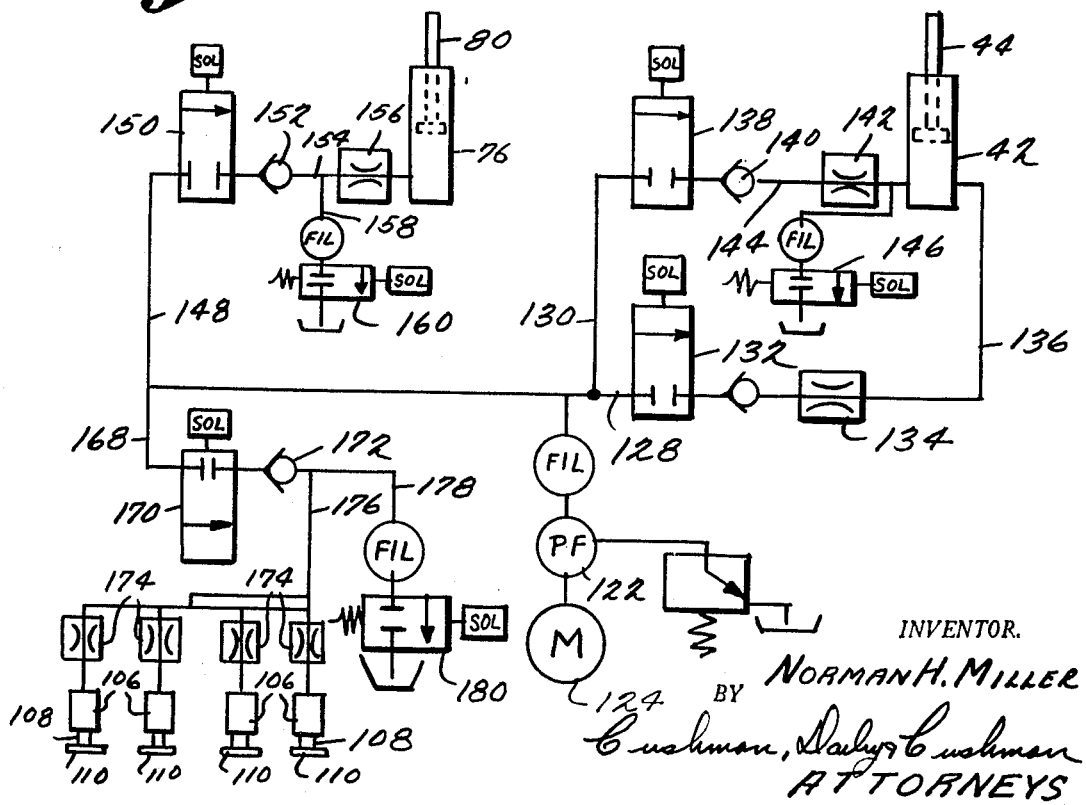
FIGURE 7 is a diagrammatic view of the hydraulic circuit of the machine.

FIGURE 7 illustrates a suitable hydraulic circuit for controlling the hoist cylinders 42 and 76 and the stabilizer cylinders 106. Hydraulic pressure is obtained from a conventional pump 122 which is operated by an electric motor 124 and, conveniently, these devices will be carried by the base 12 within a suitable housing 126 (FIGURE 4). Preferably the motor 124 is operable on standard 110 volt alternating current so that its electrical leads (not shown) may be plugged into a standard outlet.

The portion of the circuit which controls the main hoist cylinder 42 includes two pressure oil lines 128 and 130. The pressure line 128 connects with a normally closed solenoid valve 132 which is adapted, when energized, to pass pressure oil through a flow regulator 134 and a line 136 to the lower end of the cylinder 42. The other pressure line 130 connects with a normally closed solenoid valve 138 which is adapted, when energized, to pass pressure oil through a check valve 140, a flow regulator 142 and a line 144 to the lower end of the cylinder. A third normally closed solenoid valve 146 connects with the line 144 and with exhaust. The flow regulator 142 is constructed to pass a lesser oil flow than the regulator 134 with the result that energization of the valve 138 raises the piston rod 44 at a higher rate than does energization of the valve 132. Energization of the valve 146 retracts the piston rod 44 by allowing oil in the cylinder to flow to exhaust.

The portion of the circuit which controls the secondary hoist cylinder 76 includes a pressure line 148 from which pressure oil may be delivered to the lower end of the cylinder 76 through a normally closed solenoid valve 150, a check valve 152, a line 154 and a flow regulator 156. Oil is relieved from the cylinder 76 through the line 154, a line 158, and a normally closed solenoid valve 160.

The valves 132, 138, 146, 150 and 160 are located in the housing 126 and, conveniently, are energized by push buttons disposed so as to be readily accessible to an operator. As shown, there is provided a manually portable control box 162 which is electrically connected to the valves through a flexible cable 164 and which retains a push button 166 for each valve.

The stabilizer cylinders 106 may be operated from the same hydraulic circuit. As shown, pressure oil is delivered to the cylinders through a pressure line 168, a normally closed solenoid valve 170, a check valve 172, a flow regulator 174 and a line 176. Oil is relieved from the cylinders 106 through the line 176, a line 178 and a normally closed solenoid valve 180. The valves 170 and 180 may be operated by push buttons (not shown) which can be located in the control box or elsewhere on the machine 10.

In using the machine 10 an operator will generally first load the equipment to be handled, for example a large light fixture, onto the upper surfaces of the arms 22 either manually or with the aid of a fork lift. At this time both hoist cylinders are fully retracted, as seen in FIGURE 3, so that arms 22 are at a convenient height above the floor. When the operator desires to raise the equipment to ceiling height he steps onto the platform 16 and presses and holds the push button 166 which corresponds to the valve 132 with the result that pressure oil flows to the cylinder 42 and begins to extend the piston rod 44 and crosshead 46. This causes the hoist plate 58 to rise further than the piston rod 44 through the interaction of the sprockets 48 on the chains 50. When the crosshead 46 engages the abutment 60, the inner mast section 32 begins to rise relative to the outer mast section 30 thereby extending the range of vertical movement of the hoist plate 58.

The operator platform 16 and secondary mast 18, being rigidly connected to the hoist plate 58, rise with the latter. As ceiling height is approached the operator will release the initially-depressed push button and will extend the piston rod 44 in increments by alternately depressing and releasing the button which corresponds to the low lift speed valve 138. The arms may be raised to additional height by depressing the button corresponding to the valve 150. This extends the piston rod 80 of the secondary mast cylinder 76 so that the inner section 66 is raised through the interaction of the sprockets 80 and chains 84. Obviously, various sequences of extension and retraction of the mast sections 66 and 32 may be employed to position the arms 22 and the platform 16 at desired heights.

Modifications may be made to the construction described and illustrated herein without departing from the scope of the invention. Therefore, it is not intended that the disclosed details be limiting except as they appear in the appended claims.

What is claimed is:

1. A mobile machine for raising men and equipment to variable heights above floor level comprising: a rigid base having floor-engaging wheels mounted thereon; a pair of rigid stabilizer arms pivoted at one end to each of two opposite sides of said base for swinging movement in a horizontal plane, said arms being capable of swinging to positions generally parallel to said sides so as to reduce the overall transverse dimension of said machine; and a floor-engageable member carried at the outer end of each stabilizer arm; a first hydraulic ram assembly mounted on said base and having a vertically extensible and retractable element; an operator platform adapted to provide working space for an operator; means connecting said operator platform with said extensible and retractable element so as to be raised and lowered thereby; a second hydraulic ram assembly having a cylinder fixed with respect to said operator platform and a vertically extensible and retractable element; an equipment lifting platform disposed above said operator platform; means connecting said equipment platform with said last named extensible and retractable element so as to be raised and lowered thereby relative to said operator platform.

2. A machine as in claim 1 wherein said floor-engageable members are vertically adjustable and wherein each of said wheels includes a radially compressible tire adapted to collapse partially upon the placing of a load on said machine thereby lowering said machine so as to move said floor-engageable members into contact with the floor.

3. A machine as in claim 2 wherein each of said tires is constructed of solid resilient material and includes a tread portion shaped to define at least one relatively narrow circumferential rib which engages the floor.

4. A machine as in claim 2 wherein each of said vertically adjustable floor-engageable members includes a vertically disposed hydraulic cylinder fixed to the respective stabilizer arm, a depending piston rod and a foot affixed to the lower end of said piston rod.

5. A machine as in claim 1 wherein said means connecting said operator platform with said extensible and retractable element includes a rotatable wheel carried by said element, a chain trained over said wheel, means fixing one end of said chain relative to said base, and means securing the other end of said chain to said operator platform; and wherein said means connecting said equipment platform with its respective extensible and retractable element includes a rotatable wheel carried by said last-mentioned element, a chain trained over said wheel, means fixing one end of said chain relative to said operator platform, and means securing the other end of said chain to said equipment platform.

References Cited

UNITED STATES PATENTS

| | | | |
|---|---|---|---|
| 2,938,595 | 5/1960 | Miller | 182—129 |
| 3,202,242 | 8/1965 | Dolphin | 187—9 |
| 3,208,556 | 9/1965 | Shaffer | 187—9 |

REINALDO P. MACHADO, *Primary Examiner.*